(12) United States Patent
Noguchi et al.

(10) Patent No.: US 7,927,169 B2
(45) Date of Patent: Apr. 19, 2011

(54) METHOD OF MANUFACTURING THIN FILM, SUBSTRATE HAVING THIN FILM, ELECTRON EMISSION MATERIAL, METHOD OF MANUFACTURING ELECTRON EMISSION MATERIAL, AND ELECTRON EMISSION DEVICE

(75) Inventors: Toru Noguchi, Ueda (JP); Akira Magario, Takeshi-mura (JP)

(73) Assignee: Nissin Kogyo Co., Ltd., Ueda (JP)

( * ) Notice: Subject to any disclaimer, the term of this patent is extended or adjusted under 35 U.S.C. 154(b) by 855 days.

(21) Appl. No.: 11/282,614

(22) Filed: Nov. 21, 2005

(65) Prior Publication Data

US 2006/0214560 A1 Sep. 28, 2006

(30) Foreign Application Priority Data

Nov. 22, 2004 (JP) .................................. 2004-337620
Oct. 21, 2005 (JP) .................................. 2005-307394

(51) Int. Cl.
*H01J 9/12* (2006.01)

(52) U.S. Cl. .......................... 445/51; 313/495; 428/367

(58) Field of Classification Search ..................... 445/51; 313/495–497; 428/367
See application file for complete search history.

(56) References Cited

U.S. PATENT DOCUMENTS

| | | | |
|---|---|---|---|
| 5,686,182 A * | 11/1997 | Maniar | 430/111.35 |
| 6,712,989 B1 * | 3/2004 | Awakura et al. | 252/62.51 R |
| 6,919,401 B2 | 7/2005 | Mabuchi et al. | |
| 7,119,354 B2 | 10/2006 | Yagihashi et al. | |
| 2002/0185770 A1 * | 12/2002 | McKague | 264/108 |
| 2003/0096104 A1 | 5/2003 | Tobita et al. | |
| 2003/0122111 A1 | 7/2003 | Glatkowski | |
| 2003/0125478 A1 * | 7/2003 | Mari Beek et al. | 525/397 |
| 2004/0131533 A1 * | 7/2004 | Spacie et al. | 423/448 |
| 2004/0241440 A1 | 12/2004 | Noguchi et al. | |

FOREIGN PATENT DOCUMENTS

| | | |
|---|---|---|
| CN | 1535999 A | 10/2004 |
| CN | 1536024 A | 10/2004 |
| EP | 1 361 257 A1 | 11/2003 |
| EP | 1 445 647 A1 | 8/2004 |
| EP | 1 466 940 A1 | 10/2004 |
| EP | 1 500 677 A2 | 1/2005 |
| JP | A-05-339441 | 12/1993 |
| JP | A-06-126737 | 5/1994 |

(Continued)

OTHER PUBLICATIONS

Noguchi et al., "Structure and Properties for Carbon Nanofiber/Elastomer Nanocomposites," Sep. 10, 2003, 52d SPSJ Symposium on Macromolecules, pp. 1785-1786, (with English-language translation of relevant portions).

(Continued)

*Primary Examiner* — Nimeshkumar D Patel
*Assistant Examiner* — Christopher M Raabe
(74) *Attorney, Agent, or Firm* — Oliff & Berridge, PLC

(57) ABSTRACT

A method of manufacturing a thin film, including: mixing carbon nanofibers into an elastomer including an unsaturated bond or a group having affinity to the carbon nanofibers, and dispersing the carbon nanofibers by applying a shear force to obtain a carbon fiber composite material; mixing the carbon fiber composite material and a solvent to obtain a coating liquid; and applying the coating liquid to a substrate to form a thin film.

19 Claims, 9 Drawing Sheets

FOREIGN PATENT DOCUMENTS

| | | |
|---|---|---|
| JP | A-07-090159 | 4/1995 |
| JP | A-07-286067 | 10/1995 |
| JP | A 11-349307 | 12/1999 |
| JP | A-2000-26760 | 1/2000 |
| JP | A-2000-90809 | 3/2000 |
| JP | A-2002-273741 | 9/2002 |
| JP | A-2003-077386 | 3/2003 |
| JP | A 2003-77386 | 3/2003 |
| JP | A-2003-113272 | 4/2003 |
| JP | A 2003-121892 | 4/2003 |
| JP | A-2003-342480 | 12/2003 |
| JP | A-2004-143284 | 5/2004 |
| JP | A-2004-188286 | 7/2004 |
| JP | A-2004-276232 | 10/2004 |
| JP | A-2005-97525 | 4/2005 |
| KR | 2004-87965 A | 10/2004 |
| WO | WO 2004/097853 A1 | 11/2004 |

OTHER PUBLICATIONS

Iwabuki et al., "Structure and Properties for Multi-walled Carbon Nanotube (MWNT)/EPDM Composites," May 10, 2004; 53d SPSJ Annual Meeting, pp. 930, (with English-language translation of relevant portions).
U.S. Appl. No. 10/895,351, filed Jul. 21, 2005, Toru Noguchi et al.
U.S. Appl. No. 11/041,258, filed Jan. 25, 2004, Toru Noguchi et al.
U.S. Appl. No. 11/046,249, filed Jan. 31, 2005, Toru Noguchi et al.
U.S. Appl. No. 11/133,204, filed May 20, 2005, Toru Noguchi et al.
U.S. Appl. No. 11/134,292, filed May 23, 2005, Akira Magario et al.
U.S. Appl. No. 11/134,266, filed May 23, 2005, Toru Noguchi et al.
U.S. Appl. No. 11/180,573, filed Jul. 14, 2005, Toru Noguchi et al.
U.S. Appl. No. 11/183,753, filed Jul. 19, 2005, Akira Magario et al.
U.S. Appl. No. 11/214,737, filed Aug. 31, 2005, Akira Magario et al.
U.S. Appl. No. 11/219,706, filed Sep. 7, 2005, Akira Magario et al.
U.S. Appl. No. 11/219,707, filed Sep. 7, 2005, Akira Magario et al.
Jun. 28, 2010 Chinese Office Action issue in Chinese Patent Application No. 200910143046.8 w/English translation.

* cited by examiner

METHOD OF MANUFACTURING THIN FILM, SUBSTRATE HAVING THIN FILM, ELECTRON EMISSION MATERIAL, METHOD OF MANUFACTURING ELECTRON EMISSION MATERIAL, AND ELECTRON EMISSION DEVICE

Japanese Patent Application No. 2004-337620, filed on Nov. 22, 2004, and Japanese Patent Application No. 2005-307394, filed on Oct. 21, 2005, are hereby incorporated by reference in their entirety.

BACKGROUND OF THE INVENTION

The present invention relates to a method of manufacturing a thin film, a substrate having a thin film, an electron emission material and a method of manufacturing the same, and an electron emission device.

In recent years, application of carbon nanofibers to electromagnetic devices has been studied.

For example, a method of manufacturing a thin film by causing the carbon nanofibers to be directly grown on a substrate has been proposed (e.g. JP-A- 11-349307).

However, the size and the shape of the thin film are limited when using the method of causing the carbon nanofibers to be directly grown on a substrate. Moreover, the resulting substrate is expensive due to low manufacturing efficiency.

A method of manufacturing a thin film by spraying a dispersion liquid containing the carbon nanofibers has also been proposed (e.g. JP-A-2003-121892).

However, since the carbon nanofibers are generally produced in the form of an aggregated powder or a bundle, the carbon nanofibers are not uniformly dispersed in the dispersion liquid. Therefore, it is difficult to improve the dispersibility of the carbon nanofibers in the resulting thin film.

In recent years, an electron emission device in which electrons are emitted upon application of an electric field has been proposed for a display (field emission display: FED) such as a thin television or a flat lighting device in order to deal with a demand for energy saving. The electron emission device is required to allow electron emission at a low electric field and have a high current density and long life. The carbon nanofibers proposed as an electron emission material for the electron emission device can achieve a high current density at a low electric field. However, it was found that the carbon nanofibers break during electron emission and therefore have a short life (e.g. JP-A-2003-77386).

SUMMARY

According to a first aspect of the invention, there is provided a method of manufacturing a thin film, the method comprising:

mixing carbon nanofibers into an elastomer including an unsaturated bond or a group having affinity to the carbon nanofibers, and dispersing the carbon nanofibers by applying a shear force to obtain a carbon fiber composite material;

mixing the carbon fiber composite material and a solvent to obtain a coating liquid; and applying the coating liquid to a substrate to form a thin film.

According to a second aspect of the invention, there is provided a substrate having a thin film obtained by the above-described method.

According to a third aspect of the invention, there is provided an electron emission material comprising a thin film obtained by the above-described method.

According to a fourth aspect of the invention, there is provided an electron emission material comprising a carbon fiber composite material including an elastomer and carbon nanofibers dispersed in the elastomer.

According to a fifth aspect of the invention, there is provided a method of manufacturing an electron emission material, the method comprising:

mixing carbon nanofibers into an elastomer including an unsaturated bond or a group having affinity to the carbon nanofibers, and dispersing the carbon nanofibers by applying a shear force to obtain a carbon fiber composite material.

According to a sixth aspect of the invention, there is provided an electron emission device comprising:

a cathode including any of the above-described electron emission materials; and an anode disposed at a specific interval from the cathode, electrons being emitted from the electron emission material by applying voltage between the anode and the cathode.

DETAILED DESCRIPTION OF THE EMBODIMENT

Figure 1:
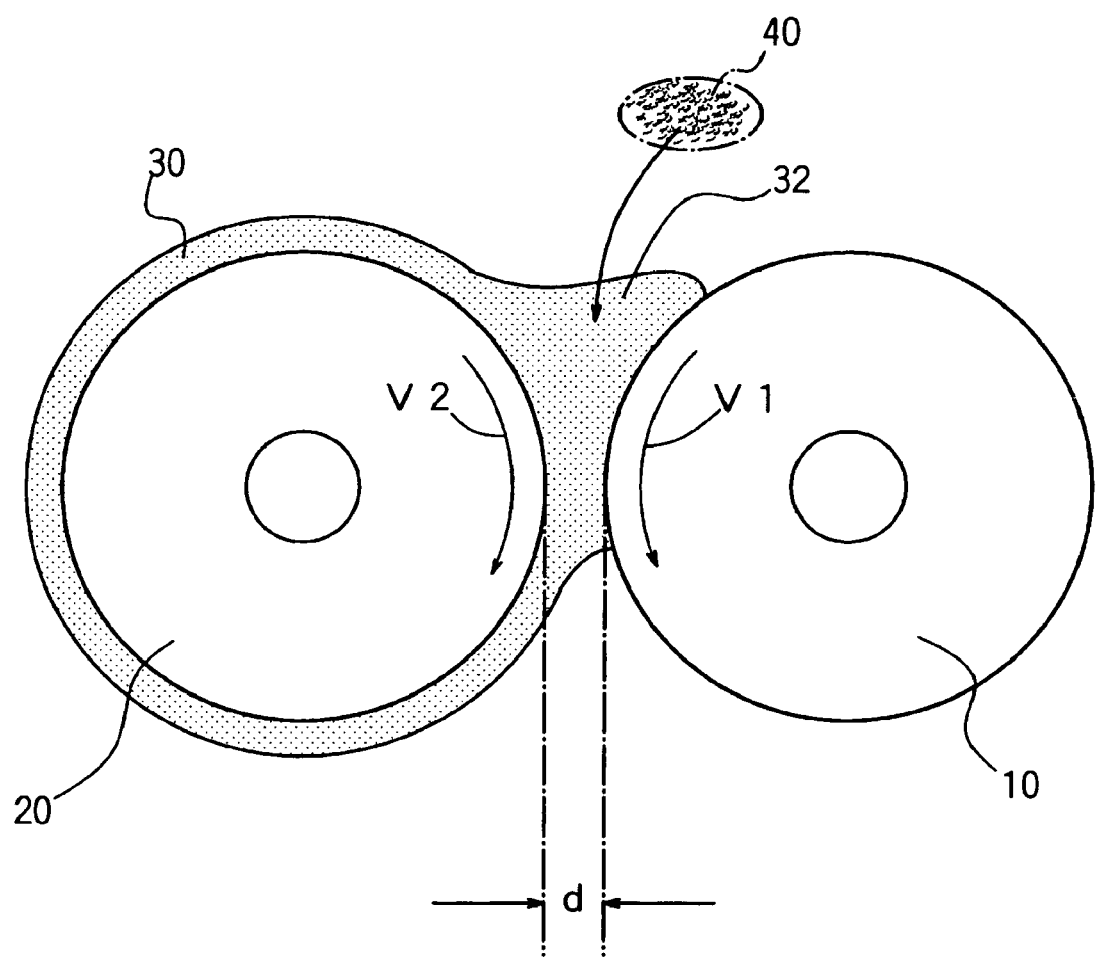
FIG. 1 is a view schematically showing a mixing method for an elastomer and carbon nanofibers utilizing an open-roll method according to one embodiment of the invention.

The invention may provide a method of manufacturing a thin film in which carbon nanofibers are uniformly dispersed, a substrate having the thin film, an electron emission material and a method of manufacturing the same, and an electron emission device.

According to one embodiment of the invention, there is provided a method of manufacturing a thin film, the method comprising:

mixing carbon nanofibers into an elastomer including an unsaturated bond or a group having affinity to the carbon nanofibers, and dispersing the carbon nanofibers by applying a shear force to obtain a carbon fiber composite material;

mixing the carbon fiber composite material and a solvent to obtain a coating liquid; and applying the coating liquid to a substrate to form a thin film.

A thin film in which the carbon nanofibers are uniformly dispersed is formed on the substrate obtained by this method of manufacturing a thin film. In the step of obtaining the carbon fiber composite material, the unsaturated bond or group of the elastomer bonds to an active site of the carbon nanofiber, particularly to a terminal radical of the carbon nanofiber, to reduce the aggregating force of the carbon nanofibers, so that the carbon nanofibers can be uniformly dispersed in the elastomer as a matrix. A coating liquid in which carbon nanofibers are suspended is obtained by dissolving the carbon fiber composite material, in which the carbon nanofibers are uniformly dispersed, in a solvent. This is because the carbon nanofibers are uniformly suspended in the coating liquid without precipitating in the solvent due to high wettability between the carbon nanofibers and the elastomer. A thin film in which the carbon nanofibers are uniformly dispersed can be formed on the substrate by applying the coating liquid to the substrate.

The thin film in this embodiment may have a g-value of a signal of an unpaired electron of carbon measured at 4.5° K by using an electron spin resonance spectrometer of 2.000 or more and less than 2.002. Since the g-value of a metal is 2.000, the thin film in this embodiment having a g-value within such a range has an electrical conductivity similar to that of a metal. Moreover, the thin film may have a line width of a signal of an unpaired electron of carbon measured at 4.5° K by using an electron spin resonance spectrometer of 300 μT or more. Such a line width indicates that the carbon nanofibers are uniformly dispersed, so that the thin film in this embodiment has an electrical conductivity similar to that of a metal.

The elastomer used in this embodiment may be a rubber elastomer or a thermoplastic elastomer. When using a rubber elastomer, the elastomer may be in a crosslinked form or an uncrosslinked form. However, a rubber elastomer in an uncrosslinked form is preferable since the carbon nanofibers are easily mixed. A network component of the elastomer in an uncrosslinked form may have a spin-spin relaxation time ($T2n$) measured at 30° C. by a Hahn-echo method using a pulsed nuclear magnetic resonance (NMR) technique of 100 to 3,000 μsec. A network component of the elastomer in an crosslinked form may have a spin-spin relaxation time ($T2n$) measured at 30° C. by a Hahn-echo method using a pulsed nuclear magnetic resonance (NMR) technique of 100 to 2,000 μsec.

In this method of manufacturing a thin film, the step of dispersing the carbon nanofibers in the elastomer by applying a shear force may be performed by:

(a) an open-roll method including tight milling with a roll interval of 0.5 mm or less;

(b) an internal mixing method;

(c) a multi-screw extrusion kneading method; or the like.

According to one embodiment of the invention, there is provided an electron emission material comprising a thin film obtained by the above-described method.

According to one embodiment of the invention, there is provided an electron emission material comprising a carbon fiber composite material including an elastomer and carbon nanofibers dispersed in the elastomer.

The above electron emission materials enable electron emission at a low electric field while maintaining long life of the carbon nanofibers by encapsulating the carbon nanofibers with the elastomer. Since the electron emission materials have an electrical conductivity similar to that of a metal while using the elastomer as the matrix, the electron emission materials enable electron injection. Moreover, since the electron emission materials include the elastomer as the matrix, the degrees of freedom of the form of the electron emission materials are high, so that it is possible to flexibly deal with a number of applications.

According to one embodiment of the invention, there is provided a method of manufacturing an electron emission material, the method comprising:

mixing carbon nanofibers into an elastomer including an unsaturated bond or a group having affinity to the carbon nanofibers, and dispersing the carbon nanofibers by applying a shear force to obtain a carbon fiber composite material.

In this method of manufacturing an electron emission material, an electron emission material including a carbon fiber composite material in which the carbon nanofibers are uniformly dispersed in the elastomer is obtained. According to this manufacturing method, an electron emission material which has an electrical conductivity similar to that of a metal while using the elastomer as the matrix and allows efficient electron emission can be obtained.

According to one embodiment of the invention, there is provided an electron emission device comprising:

a cathode including any of the above-described electron emission materials; and an anode disposed at a specific interval from the cathode, electrons being emitted from the electron emission material by applying voltage between the anode and the cathode.

This electron emission device can reduce power consumption while maintaining long life.

These embodiments of the invention are described below in detail with reference to the drawings.

The elastomer preferably has characteristics such as a certain degree of molecular length and flexibility in addition to high affinity to the carbon nanofibers. In the step of dispersing the carbon nanofibers in the elastomer by applying a shear force, it is preferable that the carbon nanofibers and the elastomer be mixed at as high a shear force as possible.

(I) Elastomer

The elastomer has a molecular weight of preferably 5,000 to 5,000,000, and still more preferably 20,000 to 3,000,000. If the molecular weight of the elastomer is within this range, since the elastomer molecules are entangled and linked, the elastomer easily enters the space between the aggregated carbon nanofibers to exhibit an improved effect of separating the carbon nanofibers. If the molecular weight of the elastomer is less than 5,000, since the elastomer molecules cannot be entangled sufficiently, the effect of dispersing the carbon nanofibers is reduced even if a shear force is applied in the subsequent step. If the molecular weight of the elastomer is greater than 5,000,000, since the elastomer becomes too hard, processing becomes difficult.

The network component of the elastomer in an uncrosslinked form has a spin-spin relaxation time ($T2n/30°$ C.), measured at 30° C. by a Hahn-echo method using a pulsed nuclear magnetic resonance (NMR) technique, of preferably 100 to 3,000 μsec, and still more preferably 200 to 1,000 μsec. If the elastomer has a spin-spin relaxation time (T2n/30° C.) within the above range, the elastomer is flexible and has a sufficiently high molecular mobility. Therefore, when mixing the elastomer and the carbon nanofibers, the elastomer can easily enter the space between the carbon nanofibers due to high molecular mobility. If the spin-spin relaxation time (T2n/30° C.) is shorter than 100 µsec, the elastomer cannot have a sufficient molecular mobility. If the spin-spin relaxation time (T2n/30° C.) is longer than 3,000 µsec, since the elastomer tends to flow as a liquid, it becomes difficult to disperse the carbon nanofibers.

The network component of the elastomer in a crosslinked form preferably has a spin-spin relaxation time (T2n), measured at 30° C. by the Hahn-echo method using the pulsed NMR technique, of 100 to 2,000 µsec. The reasons therefor are the same as those described for the uncrosslinked form. Specifically, when crosslinking an uncrosslinked form which satisfies the above conditions by using the production method of the invention, the spin-spin relaxation time (T2n) of the resulting crosslinked form almost falls within the above range.

The spin-spin relaxation time obtained by the Hahn-echo method using the pulsed NMR technique is a measure which indicates the molecular mobility of a substance. In more detail, when measuring the spin-spin relaxation time of the elastomer by the Hahn-echo method using the pulsed NMR technique, a first component having a shorter first spin-spin relaxation time (T2n) and a second component having a longer second spin-spin relaxation time (T2nn) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method in the pulsed NMR technique, a solid-echo method, a Carr-Purcell-Meiboom-Gill (CPMG) method, or a 90-degree pulse method may be applied instead of the Hahn-echo method. However, since the carbon fiber composite material according to the invention has a medium spin-spin relaxation time (T2), the Hahn-echo method is most suitable. In general, the solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

At least one of the main chain, side chain, and terminal chain of the elastomer includes an unsaturated bond or a group having affinity to the carbon nanofiber, particularly to a terminal radical of the carbon nanofiber, or the elastomer has properties of readily producing such a radical or group. The unsaturated bond or group may be at least one unsaturated bond or group selected from a double bond, a triple bond, and functional groups such as α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

The carbon nanofiber generally has a structure in which the side surface is formed of a six-membered ring of carbon atoms and the end is closed by introduction of a five-membered ring. However, since the carbon nanofiber has a forced structure, a defect tends to occur, so that a radical or a functional group tends to be formed at the defect. In one embodiment of the invention, since at least one of the main chain, side chain, and terminal chain of the elastomer includes an unsaturated bond or a group having high affinity (reactivity or polarity) to the radical of the carbon nanofiber, the elastomer and the carbon nanofiber can be bonded. This enables the carbon nanofibers to be easily dispersed by overcoming the aggregating force of the carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), poly(vinyl chloride)-based elastomer (TPVC), polyester-based elastomer (TPEE), polyurethane-based elastomer (TPU), polyamide-based elastomer (TPEA), or styrene-based elastomer (SBS); or a mixture of these elastomers may be used. The inventors of the invention confirmed that it is particularly difficult to disperse the carbon nanofibers in ethylene propylene rubber (EPR, EPDM).

(II) Carbon nanofiber

It is preferable that the carbon nanofibers have an average diameter of 0.5 to 500 nm. The carbon nanofiber may be either a linear fiber or a curved fiber.

The amount of carbon nanofibers added is not particularly limited, and may be determined depending on the application. For example, in order to ensure that the g-value of a signal of an unpaired electron of carbon measured at 4.5° K by using an electron spin resonance (ESR) spectrometer is 2.000 or more and less than 2.002 as described later, it is preferable that the carbon nanofiber content in the carbon fiber composite material be 10 to 40 vol % when using multi-wall carbon nanofibers. When using single-wall carbon nanofibers, it is preferable that the carbon nanofiber content in the carbon fiber composite material be 0.2 to 40 vol % in order to ensure that the g-value of a signal of an unpaired electron of carbon at 4.5° K is 2.000 or more and less than 2.002. In the carbon fiber composite material according to one embodiment of the invention, a crosslinked elastomer, an uncrosslinked elastomer, or a thermoplastic polymer may be directly used as the elastomer material.

As examples of the carbon nanofiber, a carbon nanotube and the like can be given. The carbon nanotube has a single-layer structure in which a graphene sheet of a hexagonal carbon layer is closed in the shape of a cylinder, or a multi-layer structure in which the cylindrical structures are nested. Specifically, the carbon nanotube may be formed only of the single-layer structure or the multi-layer structure, or the single-layer structure and the multi-layer structure may be present in combination. A carbon material having a partial carbon nanotube structure may also be used. The carbon nanotube may be called a graphite fibril nanotube.

A single-layer carbon nanotube or a multi-layer carbon nanotube is produced to a desired size by using an arc discharge method, a laser ablation method, a vapor-phase growth method, or the like.

In the arc discharge method, an arc is discharged between electrode materials made of carbon rods in an argon or hydrogen atmosphere at a pressure slightly lower than atmospheric pressure to obtain a multi-layer carbon nanotube deposited on the cathode. When a catalyst such as nickel/cobalt is mixed into the carbon rod and an arc is discharged, a single-layer carbon nanotube is obtained from soot adhering to the inner side surface of a processing vessel.

In the laser ablation method, a target carbon surface into which a catalyst such as nickel/cobalt is mixed is irradiated with strong pulse laser light from a YAG laser in a noble gas (e.g. argon) to melt and vaporize the carbon surface to obtain a single-layer carbon nanotube.

In the vapor-phase growth method, a carbon nanotube is synthesized by thermally decomposing hydrocarbons such as benzene or toluene in a vapor phase. As specific examples of the vapor-phase growth method, a floating catalyst method, a zeolite-supported catalyst method, and the like can be given.

The carbon nanofibers may be provided with improved adhesion to and wettability with the elastomer by subjecting the carbon nanofibers to a surface treatment such as an ion-injection treatment, sputter-etching treatment, or plasma treatment before mixing the carbon nanofibers into the elastomer.

As the carbon nanofibers used as the electron emission material, single-wall carbon nanotubes (SWNTs), double-wall carbon nanotubes (DWNTs), and multi-wall carbon nanotubes (MWNTs) having an average diameter of less than 100 nm are preferable. In particular, DWNTs exhibit excellent electron emission properties. The carbon nanofibers used as the electron emission material preferably have an average length of about 20 μm. The content (filling rate) of the carbon nanofibers in the carbon fiber composite material is preferably 0.1 to 40 vol %.

(III) Mixing Carbon Nanofibers Into Elastomer and Dispersing Carbon Nanofibers By Applying Shear Force to Obtain Carbon Fiber Composite Material In one embodiment of the invention, an example using an open-roll method including tight milling with a roll interval of 0.5 mm or less is described below as the step of mixing the metal particles and the carbon nanofibers into the elastomer.

FIG. 1 is a diagram schematically showing the open-roll method using two rolls. In FIG. 1, a reference numeral 10 indicates a first roll, and a reference numeral 20 indicates a second roll. The first roll 10 and the second roll 20 are disposed at a predetermined interval d (e.g. 1.5 mm). The first and second rolls are rotated normally or reversely. In the example shown in FIG. 1, the first roll 10 and the second roll 20 are rotated in the directions indicated by the arrows.

When an elastomer 30 is caused to be wound around the second roll 20 while rotating the first and second rolls 10 and 20, a bank 32 of the elastomer is formed between the rolls 10 and 20. After the addition of carbon nanofibers 40 to the bank 32, the first and second rolls 10 and 20 are rotated to obtain a mixture of the elastomer and the carbon nanofibers. The mixture is then removed from the open rolls. After setting the interval d between the first roll 10 and the second roll 20 at preferably 0.5 mm or less, and still more preferably 0.1 to 0.5 mm, the mixture of the elastomer and the carbon nanofibers is supplied to the open rolls and tight-milled. Tight milling is preferably performed about ten times, for example. When the surface velocity of the first roll 10 is indicated by V1 and the surface velocity of the second roll 20 is indicated by V2, the surface velocity ratio (V1/V2) of the first roll 10 to the second roll 20 during tight milling is preferably 1.05 to 3.00, and still more preferably 1.05 to 1.2. A desired shear force can be obtained by using such a surface velocity ratio.

This causes a high shear force to be applied to the elastomer 30 so that the aggregated carbon nanofibers are separated in such a manner that the carbon nanofibers are removed by the elastomer molecules one by one and are dispersed in the elastomer 30.

When metal or nonmetal particles are supplied to the bank 32 before supplying the carbon nanofibers, a shear force produced by the rolls causes turbulent flows to occur around the metal or nonmetal particles so that the carbon nanofibers can be further dispersed in the elastomer 30.

In this step, the elastomer and the carbon nanofibers are mixed at a relatively low temperature of preferably 0 to 50° C., and still more preferably 5 to 30° C. in order to obtain as high a shear force as possible. When using EPDM as the elastomer, it is preferable to perform two-stage mixing steps. In the first mixing step, EPDM and the carbon nanofibers are mixed at a first temperature which is 50 to 100° C. lower than the temperature in the second mixing step in order to obtain as high a shear force as possible. The first temperature is preferably 0 to 50° C., and still more preferably 5 to 30° C. A second temperature of the rolls is set at a relatively high temperature of 50 to 150° C. so that the dispersibility of the carbon nanofibers can be improved.

Since the elastomer according to one embodiment of the invention has the above-described characteristics, specifically, the above-described molecular configuration (molecular length), molecular motion, and chemical interaction with the carbon nanofibers, dispersion of the carbon nanofibers is facilitated. Therefore, a carbon fiber composite material exhibiting excellent dispersibility and dispersion stability (carbon nanofibers rarely reaggregate) can be obtained. In more detail, when mixing the elastomer and the carbon nanofibers, the elastomer having an appropriately long molecular length and a high molecular mobility enters the space between the carbon nanofibers, and a specific portion of the elastomer bonds to a highly active site of the carbon nanofiber through chemical interaction. When a high shear force is applied to the mixture of the elastomer and the carbon nanofibers in this state, the carbon nanofibers move accompanying the movement of the elastomer, whereby the aggregated carbon nanofibers are separated and dispersed in the elastomer. The dispersed carbon nanofibers are prevented from reaggregating due to chemical interaction with the elastomer, whereby excellent dispersion stability can be obtained.

In the step of dispersing the carbon nanofibers in the elastomer by applying a shear force, the above-described internal mixing method or multi-screw extrusion kneading method may be used instead of the open-roll method. In other words, it suffices that a shear force sufficient to separate the aggregated carbon nanofibers be applied to the elastomer.

A carbon fiber composite material obtained by the step of mixing and dispersing the carbon nanofibers in the elastomer (mixing and dispersion step) may be formed after crosslinking the carbon fiber composite material by using a crosslinking agent, or may be formed without crosslinking the carbon fiber composite material.

In the mixing and dispersing step of the elastomer and the carbon nanofibers, or in the subsequent step, a compounding ingredient usually used in the processing of an elastomer such as rubber may be added. As the compounding ingredient, a known compounding ingredient may be used. As examples of the compounding ingredient, a crosslinking agent, vulcanizing agent, vulcanization accelerator, vulcanization retarder, softener, plasticizer, curing agent, reinforcing agent, filler, aging preventive, colorant, and the like can be given.

Figure 5:
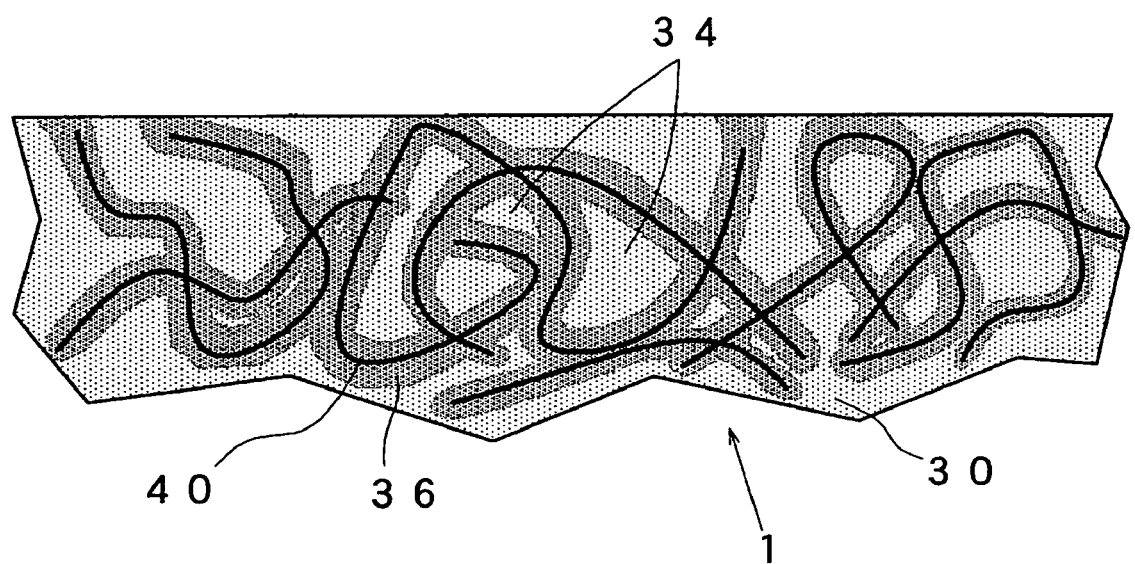
FIG. 5 is a schematic enlarged view showing a part of a carbon fiber composite material (electron emission material) according to one embodiment of the invention.

FIG. 5 is a cross-sectional view schematically showing the carbon fiber composite material according to one embodiment of the invention. In a carbon fiber composite material 1 according to one embodiment of the invention obtained by the above-described step, the carbon nanofibers 40 are uniformly dispersed in the elastomer 30 as a matrix. An interfacial phase 36 is formed around the carbon nanofiber 40. The interfacial phase 36 is considered to be an aggregate of the molecules of the elastomer 30 formed when the molecular chain of the elastomer 30 is cut during mixing, and free radicals produced attack and adhere to the surface of the carbon nanofiber 40. The interfacial phase 36 is considered to be similar to bound rubber formed around carbon black when mixing an elastomer and carbon black, for example. The interfacial phase 36 covers and protects the carbon nanofiber 40. Moreover, the elastomer is divided by the chain of the interfacial phases 36 so that small cells 34 of the elastomer having a nanometer size and enclosed by the interfacial phases 36 are formed. The interfacial phase 36 prevents breakage of the carbon nanofiber 40 due to electron emission by covering the carbon nanofiber 40, so that an electron emission material having improved life can be obtained. The carbon fiber composite material according to one embodiment of the invention may be used as an electron emission material in the form of a thin film described later, or may be used as an electron emission material in another form depending on the application. For example, the carbon fiber composite material may be used in the form of a sheet obtained by using the open roll method. Or, the carbon fiber composite material obtained by the above-described step may be formed into a complicated shape by using an injection molding method, a transfer molding method, a press molding method, or the like, or may be formed into a product having a continuous shape, such as a sheet shape, an angular cylindrical shape, or a round cylindrical shape, by using an extrusion method, a calendering method, or the like. The elastomer in the carbon fiber composite material may be either crosslinked or uncrosslinked.

The carbon nanofibers are generally entangled and dispersed in a medium to only a small extent. However, since the carbon nanofibers are dispersed in the elastomer in the carbon fiber composite material according to one embodiment of the invention, the carbon nanofibers can be easily dispersed in a medium by dissolving the carbon fiber composite material as a raw material in a solvent, for example.

(IV) Mixing Carbon Fiber Composite Material and Solvent to Obtain Coating Liquid The step of obtaining a coating liquid according to one embodiment of the invention includes mixing the carbon fiber composite material and a solvent. The carbon fiber composite material according to one embodiment of the invention does not precipitate when dissolved in a solvent due to excellent wettability between the carbon nanofibers and the elastomer. This is because the carbon nanofibers are uniformly suspended in the coating liquid in a state in which the carbon nanofibers are entangled with the dissolved elastomer molecules. Moreover, the carbon nanofibers exist in the coating liquid while being covered with the interfacial phase.

As the solvent used in this step, a solvent including at least one of aromatic hydrocarbon solvents such as toluene and xylene and alicyclic hydrocarbon solvents such as cyclohexane may be appropriately selected depending on the type of elastomer. The solvent may be appropriately selected corresponding to the elastomer from organic solvents such as toluene, benzene, cyclohexane, thinner (mixed solvent), ethylene glycol, monoethyl ether (cellosolve), ethylene glycol monoethyl ether acetate (cellosolve acetate), ethylene glycol monobutyl ether (butyl cellosolve), ethylene glycol monomethyl ether (methyl cellosolve), ortho-dichlorobenzene, chlorobenzene, chloroform, carbon tetrachloride, 1,4-dioxane, 1,2-dichloroethane (ethylene dichloride), 1,2-dichloroethylene (acetylene dichloride), 1,1,2,2-tetrachloroethane (acetylene tetrachloride), xylene, N,N-dimethylformamide, styrene, tetrachloroethylene (perchloroetyhlene), trichloroethylene, 1,1,1-trichloroethane, carbon disulfide, n-hexane, acetone, isobutyl alcohol, isopropyl alcohol, isopentyl alcohol, ethyl ether, ethylene glycol monoethyl ether, xylene (ortho), xylene (meta), xylene(para), cresol (ortho), cresol (meta), cresol (para), isobutyl acetate, isopropyl acetate, isopentyl acetate, ethyl acetate, butyl acetate, propyl acetate, pentyl acetate, methyl acetate, cyclohexanol, 1,4-dioxane, dichloromethane, tetrahydrofuran, n-hexane, 1-butanol, 2-butanol, methanol, methyl isobutyl ketone, methyl ethyl ketone, methylcyclohexanol, methylcyclohexanone, methyl butyl ketone, industrial gasoline, coal tar naphtha (solvent naphtha), petroleum ether, petroleum naphtha (light), petroleum naphtha (heavy), petroleum benzine, turpentine oil, and mineral spirit. For example, toluene is used when the elastomer in the carbon fiber composite material is natural rubber (NR) or styrene-based elastomer (SBS), and cyclohexane is used when the elastomer is EPDM.

(V) Applying Coating Liquid to Substrate to Form Thin Film

In the step of applying the coating liquid to a substrate to form a thin film according to one embodiment of the invention, a method of applying the coating liquid to a substrate to a uniform thickness may be employed. The application method is preferably performed by using a method selected from a spin coating method, a dipping method, a screen printing method such as electrostatic painting, a spraying method, and an inkjet method. The applied coating liquid is freeze-dried or thermally dried in a reduced-pressure thermostat or cured by application of ultraviolet rays to form a thin film. The thickness of the thin film is preferably 0.5 to 10 μm, although the thickness of the thin film differs depending on the formation method for the thin film.

In one embodiment of the invention, an example using a spin coating method is described below as the step of applying the coating liquid to the substrate.

Figure 2:
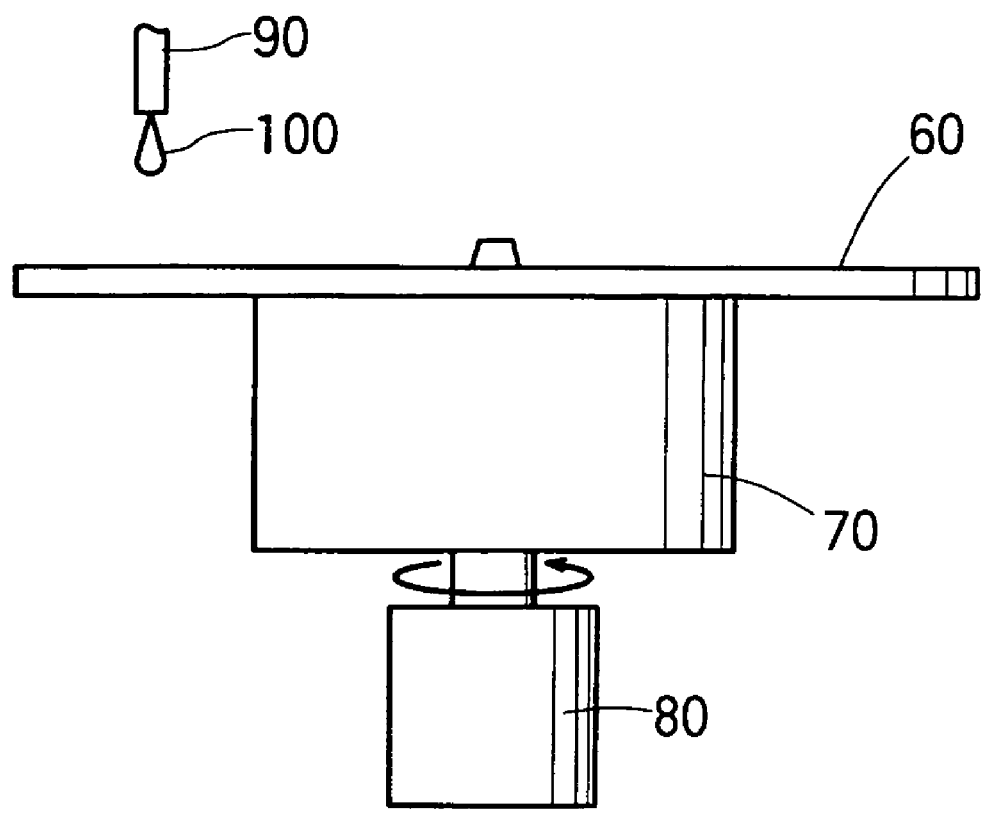
FIG. 2 is a view schematically showing solution application by using a spin coater according to one embodiment of the invention.

As shown in FIG. 2, a disk-shaped substrate 60 is placed on a substrate support stage 70 connected with a motor 80, for example. The substrate 60 is secured on the substrate support stage 70 by causing the substrate 60 to adhere to the substrate support stage 70 under vacuum by using vacuum means (not shown) provided in the substrate support stage 70, and the substrate support stage 70 and the substrate 60 are rotated by using the motor 80 at a rotational speed of 2000 rpm, for example. A coating liquid 100 obtained by the above-described (e) is applied over the entire surface of the substrate 60 by dripping the coating liquid 100 onto the substrate 60 from an application nozzle 90 while rotating the substrate 60. The applied liquid is freeze-dried in a reduced-pressure thermostat to form a thin film on the substrate 60.

As the material for the substrate 60, a metal such as gold, copper, or aluminum, a semiconductor such as a silicon wafer, glass, a polymer material, or the like may be used.

Since the carbon nanofibers are uniformly suspended in the coating liquid obtained by the above-described (d) without precipitating in the coating liquid, the carbon nanofibers can be uniformly dispersed over the substrate by using the spin coating method.

(VI) Thin Film Formed on Substrate

The carbon nanofibers are uniformly dispersed in the thin film formed on the substrate by using the method according to one embodiment of the invention. The thin film according to one embodiment of the invention may be used as an electromagnetic material or an electron emission material.

The dispersion state of the carbon nanofibers in the thin film may be determined by subjecting the thin film to measurement by the Hahn-echo method using the pulsed NMR technique.

The spin-lattice relaxation time (T1) measured by the Hahn-echo method using the pulsed NMR technique is a measure indicating the molecular mobility of a substance together with the spin-spin relaxation time (T2). In more detail, the shorter the spin-lattice relaxation time of the thin film, the lower the molecular mobility and the harder the thin film. The longer the spin-lattice relaxation time of the thin film, the higher the molecular mobility and the softer the thin film.

In the thin film, the carbon nanofibers are uniformly dispersed in the elastomer as the matrix. In other words, the elastomer is restrained by the carbon nanofibers. The mobility of the elastomer molecules restrained by the carbon nanofibers is low in comparison with the case where the elastomer molecules are not restrained by the carbon nanofibers. Therefore, the first spin-spin relaxation time (T2$n$), the second spin-spin relaxation time (T2$nn$), and the spin-lattice relaxation time (T1) of the thin film according to one embodiment of the invention are shorter than those of the elastomer which does not contain the carbon nanofibers. The spin-lattice relaxation time (T1) of the thin film in a crosslinked form changes in proportion to the amount of carbon nanofibers mixed.

In a state in which the elastomer molecules are restrained by the carbon nanofibers, the number of non-network components (non-reticulate chain components) is considered to be reduced for the following reasons. Specifically, when the molecular mobility of the elastomer is entirely decreased by the carbon nanofibers, since the number of non-network components which cannot easily move is increased, the non-network components tend to behave in the same manner as the network components. Moreover, since the non-network components (terminal chains) easily move, the non-network components tend to be adsorbed on the active sites of the carbon nanofibers. It is considered that these phenomena decrease the number of non-network components. Therefore, the fraction (fnn) of components having the second spin-spin relaxation time is smaller than that of the elastomer which does not contain the carbon nanofibers. The fraction (fn) of components having the first spin-spin relaxation time is greater than that of the elastomer which does not contain the carbon nanofibers, since "fn+fnn=1".

Therefore, the thin film according to one embodiment of the invention preferably has values measured by the Hahn-echo method using the pulsed NMR technique within the following range.

Specifically, it is preferable that the thin film in an uncrosslinked form have a first spin-spin relaxation time (T2$n$) measured at 110° C. of 100 to 3,000 μsec, a second spin-spin relaxation time (T2$nn$) measured at 110° C. of either 0 μsec or 1,000 to 10,000 μsec, a fraction (fn) of components having the first spin-spin relaxation time of 0.95 or more, and a fraction (fnn) of components having the second spin-spin relaxation time of less than 0.05.

The dispersion state of the carbon nanofibers in the thin film according to one embodiment of the invention may be determined by subjecting the thin film to line width measurement by using an electron spin resonance (hereinafter called "ESR") spectrometer. The electromagnetic properties of the thin film according to one embodiment of the invention may be determined by measuring the g-value of a signal of an unpaired electron of carbon by using the ESR spectrometer.

The ESR spectrometer applies microwaves to an unpaired electron (spin) and allows microwave absorption to be observed as a spectrum.

The g-value measured by using the ESR spectrometer is an apparent index when a free radical having an unpaired electron absorbs microwaves and an energy filed in a magnetic field at a specific intensity. A larger g-value indicates a higher resonance energy absorption. Therefore, the g-value characterizes a free radical. The line width measured by using the ESR spectrometer is an index indicating the interaction between unpaired electrons. The measurement of the g-value and the line width of a signal of an unpaired electron of carbon by using the ESR spectrometer is carried out at a temperature of 4.5° K at which a signal of a conduction electron is not detected.

The thin film according to one embodiment of the invention preferably has a g-value of a signal of an unpaired electron of carbon measured at 4.5 K by using the ESR spectrometer of 2.000 or more and less than 2.002. Since the g-value of a metal is 2.000, it is understood that the thin film according to the invention having a g-value within such a range has an electrical conductivity similar to that of a metal.

Figure 3:
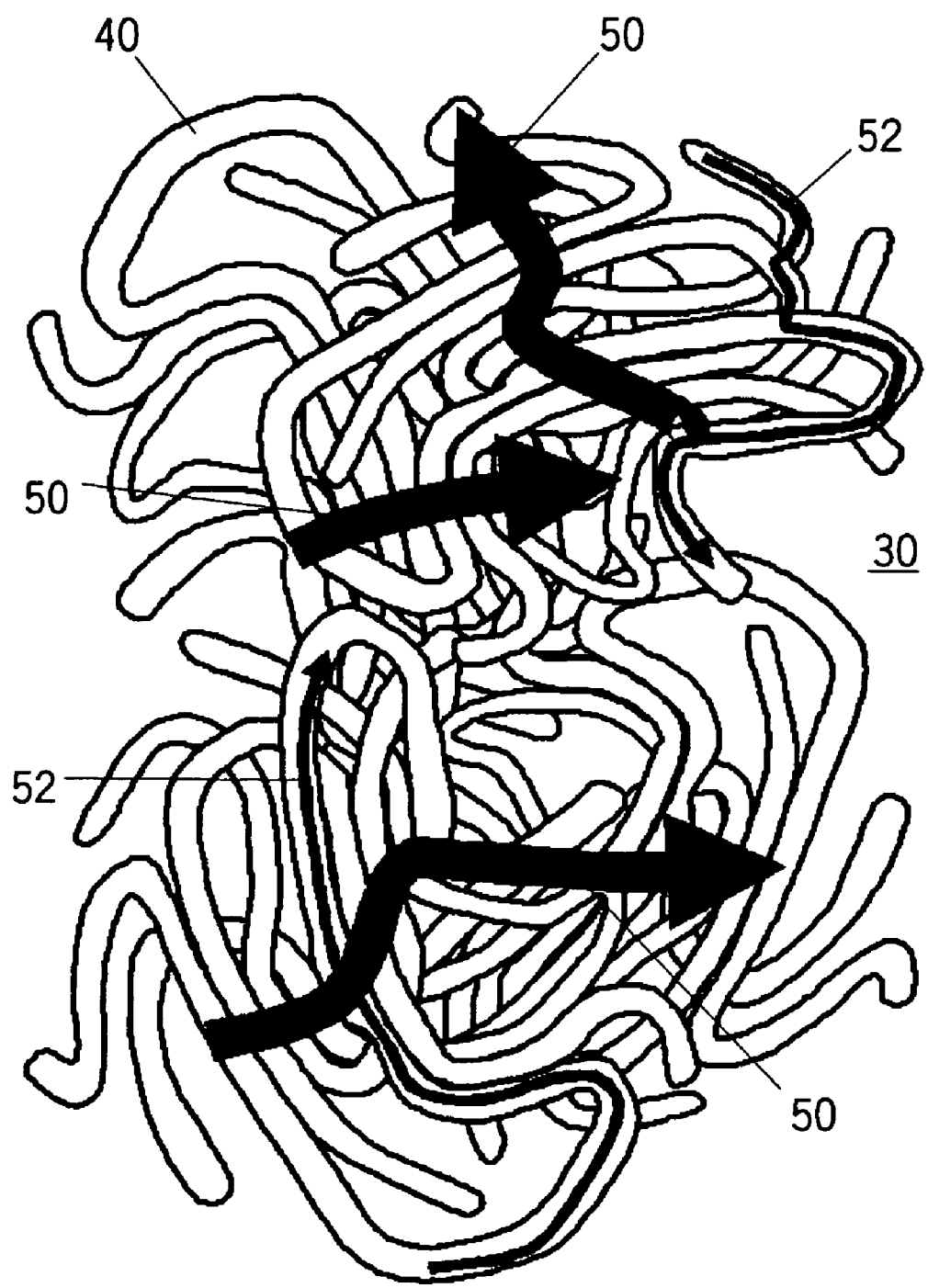
FIG. 3 is a view schematically showing aggregated carbon nanofibers and electrical conduction.
Figure 4:
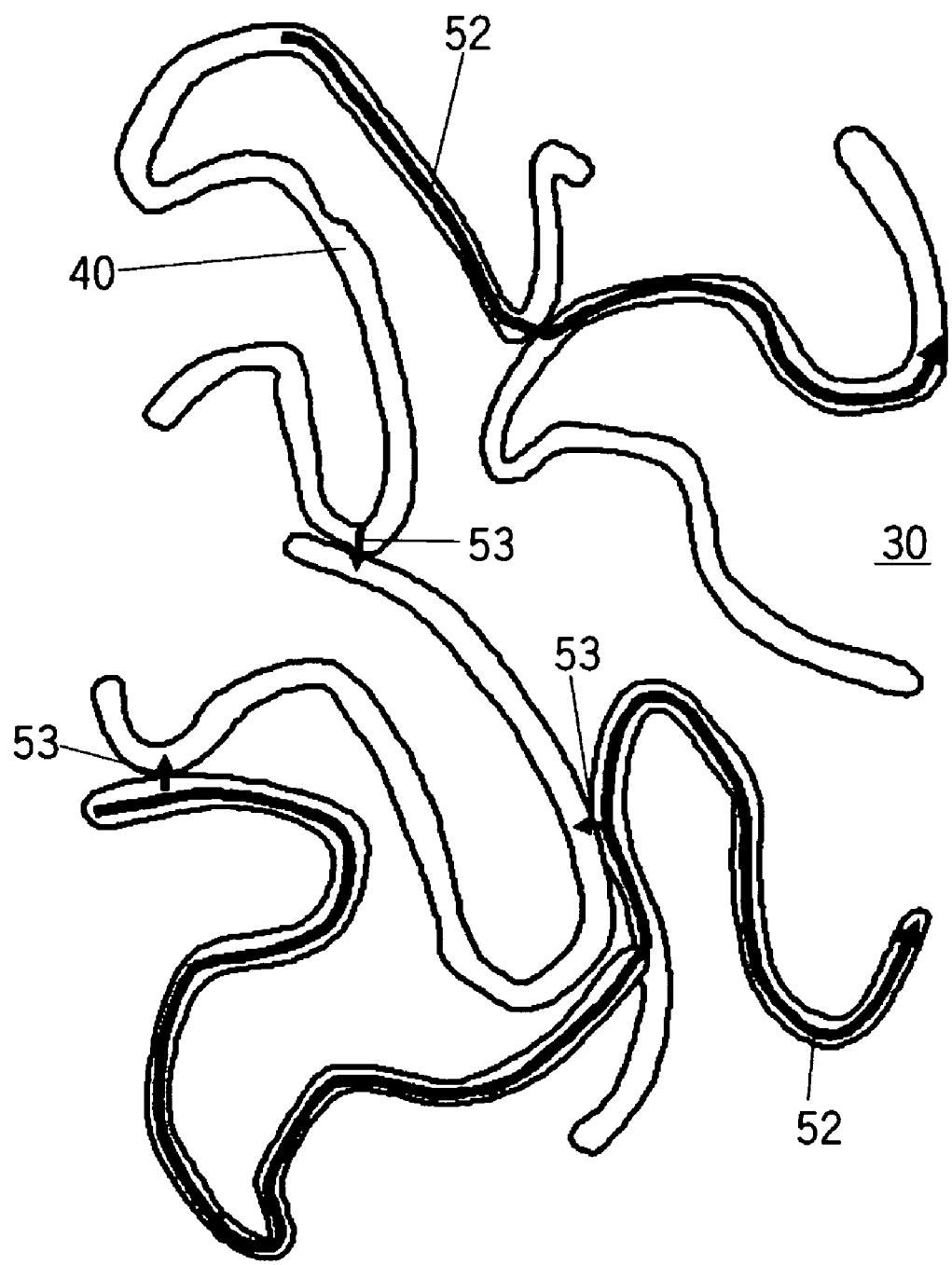
FIG. 4 is a view schematically showing the state of carbon nanofibers and electrical conduction in a thin film according to one embodiment of the invention.

The electrical conductivity of the thin film is described below with reference to FIGS. 3 and 4. FIGS. 3 and 4 are views schematically showing the state of the carbon nanofibers and electrical conduction in the thin film.

In general, when the carbon nanofibers aggregate in the elastomer, electrical conduction occurs on the side surface of the carbon nanofiber (arrow 50 in FIG. 3) and inside the carbon nanofiber (arrow 52 in FIG. 3), as shown in FIG. 3. In this state, since electrical conduction occurring on the side surface of the carbon nanofiber (arrow 50 in FIG. 3) is predominant, the g-value of a signal of an unpaired electron of carbon measured by using the ESR spectrometer is 2.0023.

However, when the carbon nanofibers are uniformly dispersed as in the thin film according to one embodiment of the invention, electrical conduction occurring inside the carbon nanofiber (arrow 52 in FIG. 4) is predominant, as shown in FIG. 4. Moreover, electrical conduction occurs at a location at which the carbon nanofibers are in contact with each other (arrow 53 in FIG. 4). As a result, the thin film has an electrical conductivity similar to that of a metal (g-value: 2.000).

The thin film according to the invention having a g-value within the above-mentioned range preferably has a line width of a signal of an unpaired electron of carbon measured at 4.5° K by using the ESR spectrometer of 300 μT or more. Such a line width indicates that the carbon nanofibers are uniformly dispersed in the thin film according to the invention and that the thin film has an electrical conductivity similar to that of a metal.

It is preferable that the thin film have a high tensile strength. The thin film according to the invention has a tensile strength higher than that of the raw material elastomer, and the tensile strength can be increased by increasing the carbon nanofiber content.

The thin film according to one embodiment of the invention is a high-efficiency electron emission material having a threshold electric field of 4 V/μm or less and a saturation current density of 10 mA/cm$^2$ or more. The thin film according to one embodiment of the invention enables electron emission at a low electric field while maintaining the life of the carbon nanofiber by encapsulating the carbon nanofiber with the elastomer, particularly the interfacial phase. Since the electron emission material according to one embodiment of the invention has an electrical conductivity similar to that of a metal while using the elastomer as the matrix, the electron emission material enables electron injection. Moreover, since the electron emission material includes the elastomer as the matrix, the degrees of freedom of the form of the electron emission material are high, so that it is possible to flexibly deal with a number of applications. The elastomer forming the thin film may be either crosslinked or uncrosslinked.

(VII) Electron Emission Device

Figure 6:
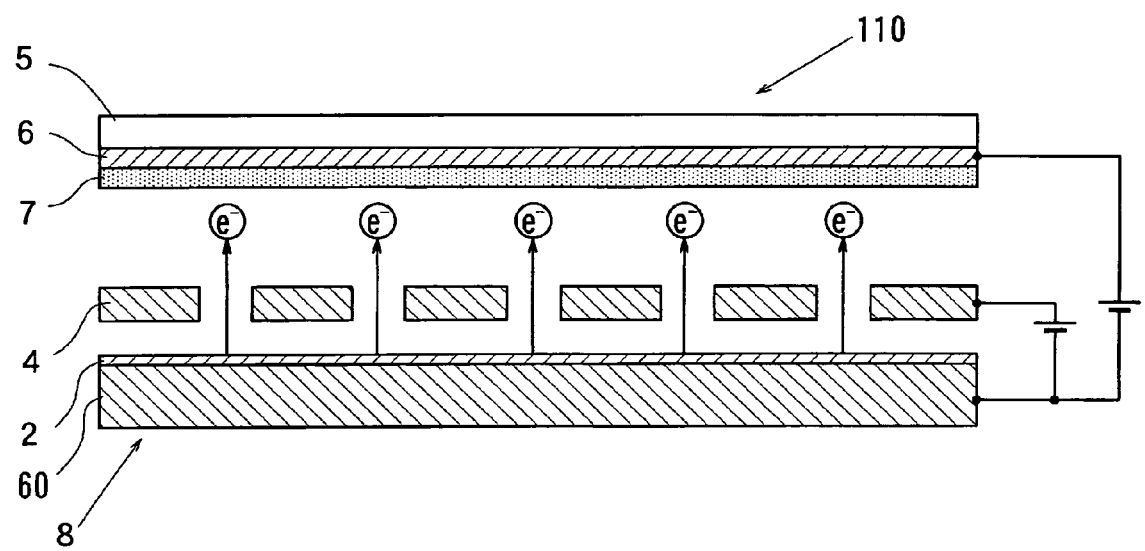
FIG. 6 is a schematic view showing a configuration of a field emission display using an electron emission device according to one embodiment of the invention.

FIG. 6 is a schematic view showing a configuration of a field emission display (FED) 110 using an electron emission device according to one embodiment of the invention. The field emission display 110 includes a cathode 8, in which a thin film (electron emission material) 2 obtained by the above-described step is formed on an electrode substrate 60, and a glass substrate 5, which is disposed at a predetermined interval from the cathode 2 through a gate electrode 4, in a vacuum airtight container, for example. An anode 6 and a fluorescent body 7 are formed in layers on the glass substrate 5 on the side of the cathode 2. Therefore, the field emission display 110 includes an electron emission device including the cathode 8 including the thin film 2, the anode 6, and the gate electrode 4 disposed between the cathode 8 and the anode 6.

When applying voltage between the cathode 8 and the gate electrode 4, electrons (e⁻) are emitted from the surface of the thin film 2 formed of the electron emission material on the side of the gate electrode 4 toward the anode 6. The electrons (e⁻) emitted from the cathode 8 progress toward the anode 6, and an image can be displayed by utilizing emission of light occurring when the electrons collide with the fluorescent body 7. An emitter as a protrusion electron emission section may be formed by subjecting the surface of the thin film 2 of the cathode 8 to a surface treatment such as etching. Or, since the entire surface of the cathode 8 is formed by the thin film 2 formed of the electron emission material, the surface of the cathode 8 can function as an emitter without etching the surface of the cathode 8.

The electron emission device exhibits high electron emission efficiency due to the carbon nanofibers dispersed in the entire thin film 2, and allows easy electron injection since the thin film 2 has an electrical conductivity equal to that of a metal. Moreover, since the carbon nanofibers are covered with the elastomer, particularly the interfacial phase, the carbon nanofibers have long life.

The electron emission material and the electron emission device thus obtained may be used for various applications in addition to the field emission display. For example, a surface emission body (surface fluorescent body) may be formed by causing emission of light over the entire surface of the electrode substrate, or the electron emission material and the electron emission device may be used for various electrodes utilizing electron emission by a hot cathode operation or a cold cathode operation for a fluorescent lamp, an electron microscope, a plasma display, or the like.

FIGS. 7 to 12 are schematic vertical cross-sectional views showing configurations of lighting devices using the electron emission material according to one embodiment of the invention.

Figure 7:
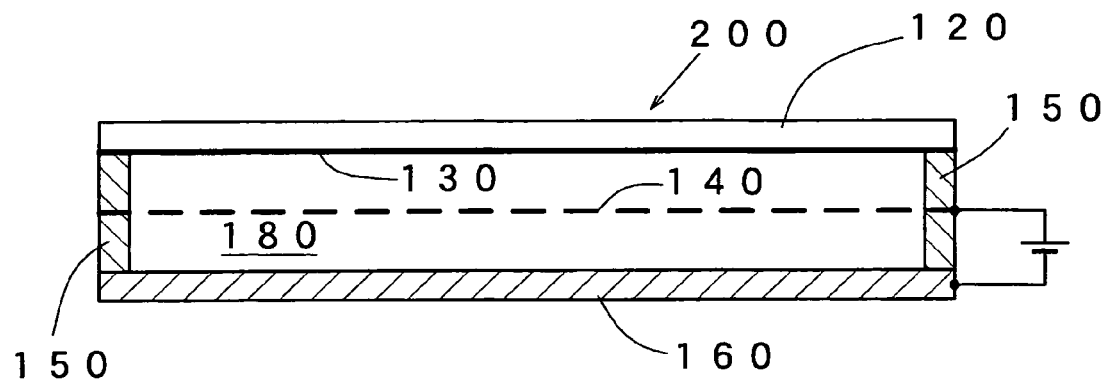
FIG. 7 is a schematic view showing a configuration of a flat lighting device according to one embodiment of the invention.

A flat lighting device 200 shown in FIG. 7 includes a cathode 160 in which the carbon fiber composite material (electron emission material) obtained by the above-described step is formed as an electrode substrate, a glass plate 120 which is disposed at a predetermined interval from the cathode 160 and in which a fluorescent pigment film 130 is formed on the side of the cathode 160, a spacer 150 which determines the interval between the glass plate 120 and the cathode 160, and a grid (anode) 140 formed between the glass plate 120 and the cathode 160. The glass plate 120, the grid 140, and the cathode 160 are in the shape of a quadrilateral flat plate, for example. The grid 140 is a metal plate having a plurality of minute openings formed by punching, electroforming, or the like. The glass plate 120 is transparent. The fluorescent pigment film 130 is applied to the surface of the glass plate 120 on the side of the cathode 160 by using a screen printing method or the like. The spacer 150 having a specific thickness is disposed at the outer edge of the flat glass plate 120 and the cathode 160 and is interposed between the glass plate 120 and the cathode 160 so that an airtight vacuum space 180 is formed between the glass plate 120 and the cathode 160. The outer edge of the grid 140 is inserted into and secured by the middle portion of the spacer 150. When applying voltage between the cathode 160 and the grid 140, electrons are emitted from the surface of the cathode 160 formed of the electron emission material on the side of the grid 140 toward the glass substrate 120, and pass through the minute openings in the grid 140. The electrons which have been emitted from the cathode 160 and passed through the minute openings in the grid 140 progress toward the anode 120, and emission of light occurs when the electrons collide with the fluorescent pigment film 130. The space between the cathode 160 and the glass plate 120 may be evacuated, or may be filled with a specific gas such as argon gas. The glass plate 120 may be transparent as in one embodiment of the invention, or may be colored in the same manner as in a known lighting device.

Figure 8:
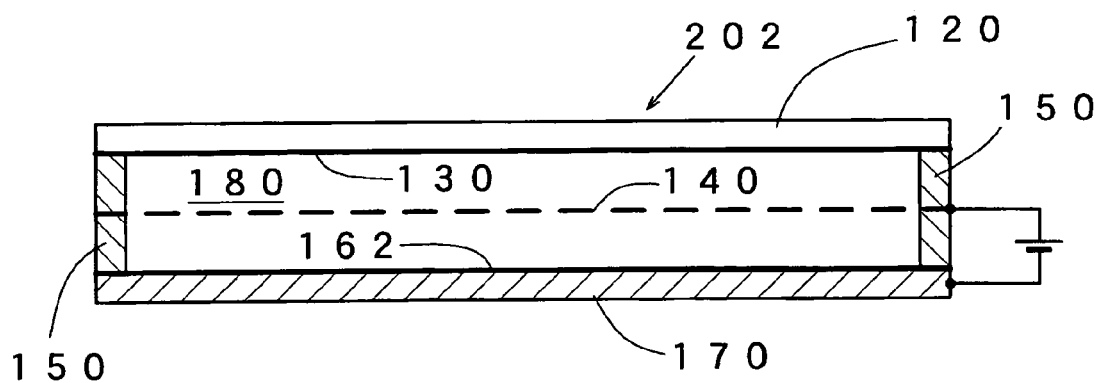
FIG. 8 is a schematic view showing a configuration of a flat lighting device according to one embodiment of the invention.

A flat lighting device 202 shown in FIG. 8 is the same as the embodiment shown in FIG. 8 except that a cathode thin film 162 is formed on a substrate 170 formed of aluminum or the like. The cathode thin film 162 is a thin film obtained by thinly applying the carbon fiber composite material (electron emission material) obtained by the above-described step to the substrate 170.

Figure 9:
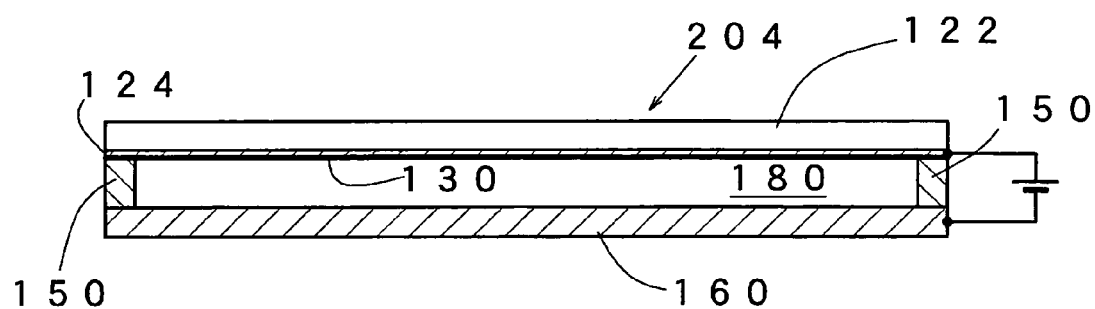
FIG. 9 is a schematic view showing a configuration of a flat lighting device according to one embodiment of the invention.

A flat lighting device 204 shown in FIG. 9 is the same as the embodiment shown in FIG. 7 except that the grid shown in FIG. 7 is removed and the flat lighting device 204 includes a transparent ITO glass plate 122 on which an anode 124 is formed on the side of the cathode 160. When using the ITO glass plate 122, the fluorescent pigment film 130 is applied to the anode 124 formed on the surface of the ITO glass plate 122 on the side of the cathode 160 by using a screen printing method or the like. Specifically, the anode 124 is disposed between the ITO glass plate 122 and the fluorescent pigment film 130 when using the ITO glass plate 122. Therefore, when applying voltage between the anode 124 and the cathode 160, electrons are emitted from the surface of the cathode 160 (electron emission material) toward the ITO glass plate 122 and collide with the fluorescent pigment film 130 so that emission of light occurs. A fluorescent pigment film may be applied to a transparent glass plate instead of the ITO glass plate 122 by using a screen printing method, and an aluminum thin film anode may be formed on the fluorescent pigment film by using a vacuum deposition method or the like.

Figure 10:
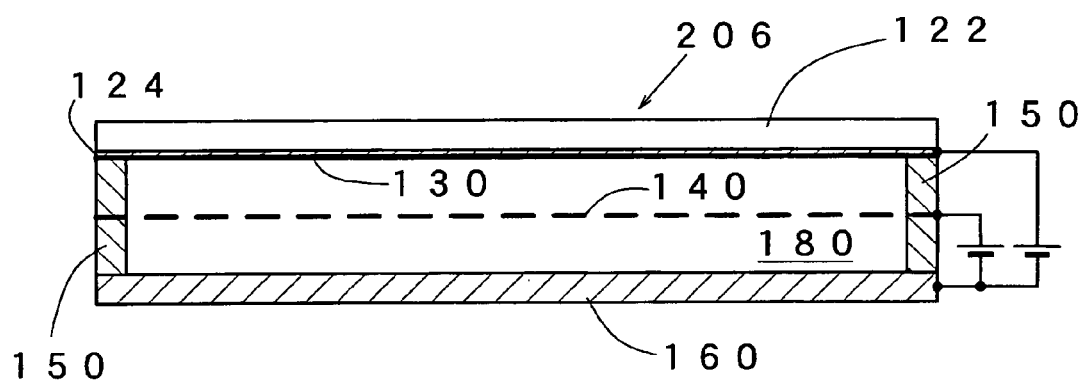
FIG. 10 is a schematic view showing a configuration of a flat lighting device according to one embodiment of the invention.

A flat lighting device 206 shown in FIG. 10 has a configuration similar to that of the field emission display (FED) 110 shown in FIG. 6, in which the grid 140 is added between the ITO glass 122 and the cathode 160 shown in FIG. 9. As described above, since the flat lighting devices 200 to 206 are thin and emit light at low power consumption, the flat lighting devices 200 to 206 can be installed as a part of a building inner wall material.

Figure 11:
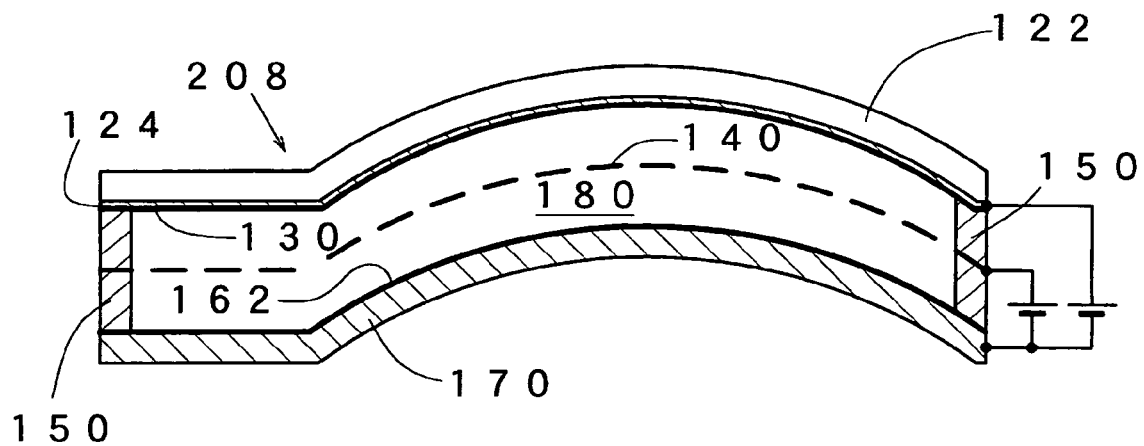
FIG. 11 is a schematic view showing a configuration of a curved lighting device according to one embodiment of the invention.

In a curved lighting device 208 shown in FIG. 11, a part of the ITO glass plate 122, the grid 140, the cathode 162, and the substrate 170 forms a curved surface. The shape of the lighting device can be arbitrarily designed by curving the electrode and the like. Therefore, the degrees of freedom of the shape of the lighting device can be increased when using the lighting device for building applications. As the pigment of the fluorescent pigment film 130, a white fluorescent pigment generally used in a lighting device is preferable. However, a fluorescent pigment of another color may be selected as required.

Figure 12:
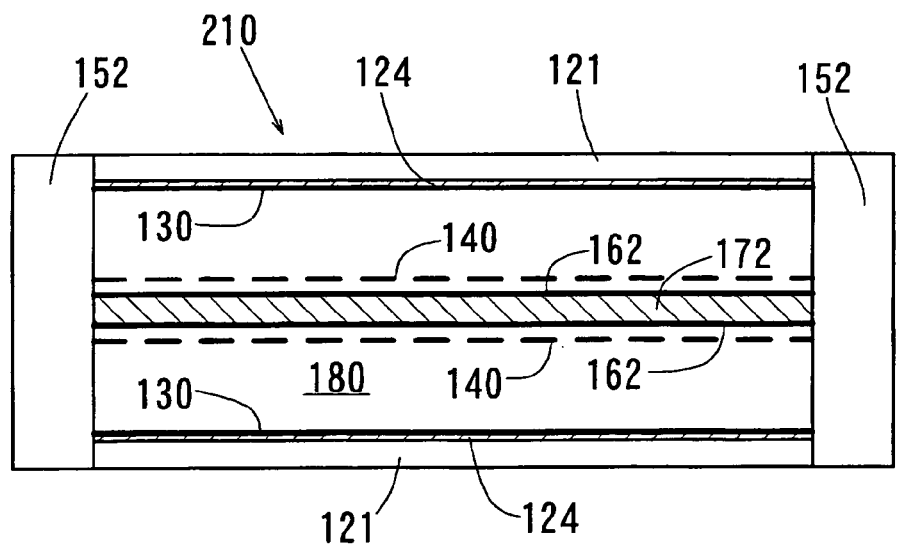
FIG. 12 is a schematic view showing a configuration of a tubular lighting device according to one embodiment of the invention.

A tubular lighting device 210 shown in FIG. 12 is a fluorescent lamp type lighting device having a circular cross-sectional shape, and has a configuration essentially the same as that of the curved lighting device 208 shown in FIG. 11. The anode 124 is formed over the inner surface of the glass enclosure 121 obtained by forming an ITO glass plate in the shape of a tube, and the fluorescent pigment film 130 is formed over the anode 124. Each end of the glass enclosure 121 is sealed with caps 152, and the sealed space 180 is maintained under vacuum. A narrow columnar electrode 172 is disposed at the center of the tubular lighting device 210, and each end of the electrode 172 is secured to the caps 152. The outer surface of the electrode 172 is covered with the cathode thin film 162. The grid 140 disposed in the shape of a tube at a specific interval from the cathode thin film 162 encloses the electrode 172. Therefore, when applying voltage between the grid 140 and the cathode thin film 162, electrons are emitted from the surface of the cathode thin film 162 formed of the electron emission material radially toward the grid 140. The electrons pass through the minute openings in the grid 140 and collide with the fluorescent pigment film 130 so that light is emitted from the entire tube. The tubular lighting device 210 is a lighting device having excellent recyclability, since the lighting device 210 is similar to a known fluorescent lamp and does not contain mercury inside the tube.

Examples according to the invention and comparative examples are described below. However, the invention is not limited to the following examples.

Examples 1 to 10 and Comparative Examples 1 to 3

(1) Preparation of Sample
(a) Preparation of Carbon Fiber Composite Material
Step 1: A predetermined amount (100 g) of elastomer shown in Tables 1 and 2 was supplied to open rolls having a roll diameter of six inches (roll temperature: 10 to 20° C.), and the elastomer was wound around the roll.

Step 2: Carbon nanofibers (indicated as "MWNT" in Table 1 and "SWNT" in Table 2) were added to the elastomer in an amount (vol %) shown in Tables 1 and 2. The roll interval was set at 1.5 mm.

Step 3: After the addition of the carbon nanofibers, the mixture of the elastomer and the carbon nanofibers was removed from the rolls.

Step 4: After reducing the roll distance from 1.5 mm to 0.3 mm, the mixture was supplied to the rolls and tight-milled. The surface velocity ratio of the rolls was set at 1.1. Tight milling was repeatedly performed ten times.

Step 5: After setting the roll interval at a predetermined interval (1.1 mm), the mixture subjected to tight milling was supplied to the rolls and sheeted. "MWNT" shown in Tables 1 and 4 indicates multi-wall carbon nanotubes having an average diameter of 13 nm (manufactured by ILJIN Nanotech Co., Ltd.), and "SWNT" shown in Tables 2 and 4 indicates single-wall carbon nanotubes having an average diameter of 1 nm (manufactured by ILJIN Nanotech Co., Ltd.). "E-SBS" shown in Tables 1 to 4 indicates a styrene-butadiene block copolymer having an epoxy content of 1.7 wt % and a styrene content of 40 wt %.

In Example 4 using EPDM, the roll temperature in the step 4 was set at 100° C. and the mixing operation was performed for 20 min in order to improve the dispersibility of the carbon nanofibers.

Carbon fiber composite materials of Examples 1 to 10 were thus obtained. In Comparative Example 1, a carbon fiber composite material was obtained by using carbon fibers having an average diameter of 28 μm ("CF" in Table 1) instead of the carbon nanofibers. In Comparative Example 2, a carbon fiber composite material was obtained by using HAF-grade carbon black having an average particle diameter of 28 nm ("HAF-CB" in Table 1) instead of the carbon nanofibers.

(b) Preparation of Coating Liquid
1 g of the carbon fiber composite material obtained in each of Examples 1 to 10 and Comparative Examples 1 and 2 was added to 100 g of a solvent and dissolved with stirring to obtain a coating liquid.

As the solvent, toluene was used in Examples 1 to 4, 6, and 7 to 10 and Comparative Examples 1 and 2 (elastomer: natural rubber or styrene butadiene block copolymer), and cyclohexane was used in Example 5 (elastomer: EPDM).

In Comparative Example 3, 50 g of the elastomer was dissolved in 100 g of toluene without preparing a carbon fiber composite material. After the addition of MWNT, the mixture was stirred to obtain a coating liquid.

(c) Preparation of Thin Film
A glass substrate placed on a spin coater was rotated at 2000 rpm. The coating liquid obtained by (b) in Examples 1 to 10 and Comparative Examples 1 to 3 was applied dropwise to the glass substrate to uniformly spread the coating liquid over the glass substrate.

The coating liquid spread over the substrate was freeze-dried at −70° C. in a reduced-pressure thermostat to form a thin film with a thickness of 5 μm on the glass substrate.

The thin film was removed from the glass substrate and subjected to the following measurements (2) to (4).

(2) Measurement Using Pulsed NMR Technique
The thin film obtained in each of Examples 1 to 10 and Comparative Examples 1 to 3 was subjected to measurement by the Hahn-echo method using the pulsed NMR technique. The measurement was conducted using "JMN-MU25" manufactured by JEOL, Ltd. The measurement was conducted under conditions of an observing nucleus of $^1H$, a resonance frequency of 25 MHz, and a 90-degree pulse width of 2 μsec, and a decay curve was determined while changing Pi in the pulse sequence (90°x-Pi-180°x) of the Hahn-echo method. The sample was measured in a state in which the sample was inserted into a sample tube within an appropriate magnetic field range. The measurement temperature was set at 110° C. in order to prevent thermal deterioration. The first spin-spin relaxation time ($T2n$) and the fraction ($fn$) of components having the first spin-spin relaxation time of the thin film were determined by this measurement. The measurement results are shown in Tables 1 and 2.

The first spin-spin relaxation time ($T2n$) and the fraction ($fn$) of components having the first spin-spin relaxation time of each elastomer are shown in Table 3.

(3) Measurement of Tensile Properties
A sample with a thickness of 1 mm was prepared by using the thin film of each of Examples 1 to 10 and Comparative Examples 1 to 3. The tensile strength of the sample was measured according to JIS K 6521-1993. The results are shown in Tables 1 and 2.

(4) Measurement Using ESR Spectrometer
The g-value and the line width (μT: microtesla) of a signal of an unpaired electron of carbon were measured for the thin films of Examples 1 to 10 and Comparative Examples 1 to 3 by using an ESR spectrometer. The measurement was conducted by using "JES-FA" manufactured by JEOL, Ltd. The thin film of each of Examples 1 to 10 and Comparative Examples 1 to 3 was cut into a strip-shaped sample with a weight of about 3 mg. The sample was inserted into a sample tube. The measurement was conducted at a temperature of 4.5° K, a magnetic field sweep of 10 mT (millitesla), and an oscillation frequency of 9 GHz using manganese (Mn) as a standard. The results are shown in Tables 1 and 2.

TABLE 1

| | | | Example | | | | | | Comparative Example | | |
|---|---|---|---|---|---|---|---|---|---|---|---|
| | | | 1 | 2 | 3 | 4 | 5 | 6 | 1 | 2 | 3 |
| Carbon fiber composite material | Elastomer | Natural rubber (NR) (vol %) | 99.6 | 98.6 | 80 | 70 | — | — | 80 | 80 | (80) |
| | | EPDM (vol %) | — | — | — | — | 80 | — | — | — | — |
| | | E-SBS (vol %) | — | — | — | — | — | 80 | — | — | — |
| | Carbon fiber | MWNT (vol %) | 0.4 | 1.4 | 20 | 30 | 20 | 20 | — | — | (20) |
| | | CF (vol %) | — | — | — | — | — | — | 20 | — | — |
| | | HAF-CB (vol %) | — | — | — | — | — | — | — | 20 | — |
| Thin film | | Thickness (μm) | 5 | 5 | 5 | 5 | 5 | 5 | 5 | 5 | 5 |
| | NMR properties (383K) | T2n | 1460 | 1170 | 1380 | 950 | 695 | 1100 | 1450 | 1380 | 2200 |
| | | fn | 0.88 | 0.956 | 1 | 1 | 0.98 | 1 | 0.941 | 0.916 | 0.92 |
| | Tensile properties | Tensile strength (MPa) | 7.5 | 7.5 | 24.7 | 33.1 | 17.1 | 44 | 1.3 | 21 | 0.8 |
| | | Elongation (%) | 340 | 240 | 130 | 100 | 120 | 250 | 280 | 195 | 50 |
| | ESR properties (4.5K) | g-value | 2.0023 | 2.0018 | 2.0015 | 2.0001 | 2.0016 | 2.0015 | 2.0023 | 2.0023 | 2.0023 |
| | | Line width (μT) | 204 | 354 | 820 | 935 | 850 | 825 | 185 | 191 | 736 |

TABLE 2

| | | | Example | | | |
|---|---|---|---|---|---|---|
| | | | 7 | 8 | 9 | 10 |
| Carbon fiber composite material | Elastomer | Natural rubber (NR) (vol %) | 99.6 | 98.6 | 96 | 92 |
| | | EPDM (vol %) | — | — | — | — |
| | | E-SBS (vol %) | — | — | — | — |
| | Carbon fiber | SWNT (vol %) | 0.4 | 1.4 | 4 | 8 |
| | | CF (vol %) | — | — | — | — |
| | | HAF-CB (vol %) | — | — | — | — |
| Thin film | | Thickness (μm) | 5 | 5 | 5 | 5 |
| | NMR properties (383K) | T2n | 1450 | 1420 | 1400 | 1370 |
| | | fn | 0.98 | 1 | 1 | 1 |
| | Tensile properties | Tensile strength (MPa) | 21.6 | 18.9 | 16.4 | 13.3 |
| | | Elongation (%) | 450 | 280 | 210 | 165 |
| | ESR properties (4.5K) | g-value | 2.0016 | 2.0013 | 2.0011 | 2.0004 |
| | | Line width (μT) | 450 | 560 | 610 | 892 |

TABLE 3

| | NMR properties (383K) | |
|---|---|---|
| Elastomer | T2n | fn |
| Natural rubber (NR) | 1450 | 0.86 |
| EPDM | 615 | 0.88 |
| E-SBS | 1740 | 0.869 |

As is clear from Tables 1 to 3, the following items were confirmed according to Examples 1 to 10 of the invention. Specifically, the spin-spin relaxation time at 110° C. (T2n/110° C.) of the thin film including the carbon nanofibers was shorter than those of the elastomer and the thin film of Comparative Example 3. The thin film including the carbon nanofibers had a fraction (fn/110° C.) greater than those of the elastomer and the thin film of Comparative Example 3. These results suggest that the carbon nanofibers were uniformly dispersed in the thin film according to the example.

As is clear from the results of the tensile properties of the thin film, it was confirmed that the thin films according to Examples 1 to 10 of the invention had an improved tensile strength due to inclusion of uniformly dispersed carbon nanofibers to exhibit a reinforcing effect. This is more clearly understood by comparing Examples 1 to 10 with Comparative Example 3 in which the carbon nanofibers were insufficiently dispersed.

It was confirmed from the thin films of Examples 2 to 4 using MWNT that the g-value of a signal of an unpaired electron of carbon in the ESR properties approaches 2.000, which is the g-value of a metal, as the carbon nanofiber content is increased. Since the thin film of Example 1 had a low MWNT content (0.4 vol %), the thin film of Example 1 had a g-value of 2.0023. The above-described tendency was confirmed for the thin films of Examples 7 to 10 using SWNT at an SWNT content lower than the MWNT content. Specifically, while the thin film containing MWNT had a g-value of 2.0001 at an MWNT content of 30 vol %, the thin film of Example 10 containing SWNT had a g-value of 2.0004 at an SWNT content as low as 8 vol %. It was confirmed that the g-value of the thin film also approaches 2.000 (g-value of metal) when using EPDM or the styrene-butadiene block copolymer as in Examples 5 and 6. The thin film of Comparative Example 3, in which the carbon nanofibers were insufficiently dispersed, had a g-value of 2.0023.

The thin films of Examples 2 to 10 had a line width of a signal of an unpaired electron of carbon of 300 μT or more. This indicates that the carbon nanofibers were uniformly dispersed and the spin (unpaired electron) concentration was high. Since the line width of a signal of an unpaired electron of carbon in the ESR properties may show a similar tendency for an unpaired electron in the carbon nanofiber aggregate as in Comparative Example 3, the dispersibility of the carbon nanofibers was determined while taking into consideration the fact that the g-value was close to 2.000.

As described above, it was found that a thin film in which the carbon nanofibers, which are generally dispersed to only a small extent, are uniformly dispersed in the elastomer is obtained according to the invention. It was found that the thin film exhibits an electrical conductivity similar to that of a metal due to uniformly dispersed carbon nanofibers.

Examples 11 to 19 and Comparative Examples 4 and 5

(5) Preparation of Sample
(a) Preparation of Carbon Fiber Composite Material

Carbon fiber composite materials of Examples 11 to 19 were obtained in the same manner as in Examples 1 to 10. In Comparative Example 4, a carbon fiber composite material was obtained by using HAF-grade carbon black having an average particle diameter of 27 nm ("HAF-CB" in Table 4) in the same manner as in Comparative Example 1. In Comparative Example 5, the carbon nanofibers were added and mixed so that the carbon nanofiber content was 40 vol %. However, a carbon fiber composite material could not be obtained. The types and the amounts of the elastomer and the carbon nanofibers are shown in Table 4. In Table 4, "DWNT" indicates double-wall carbon nanotubes having an average diameter of 2 nm and an average length of 5 μm. The average lengths of "MWNT" and "SWNT" having the same average diameter as in Examples 1 to 10 were 20 μm and 5 μm, respectively.

(b) Preparation of Electron Emission Material

The carbon fiber composite material obtained in each of Examples 11 to 18 and Comparative Example 4 was rolled by using rolls and press-formed to prepare a sheet-shaped electron emission material sample having a thickness of 1 mm. The electron emission material sample was attached to a cathode substrate formed of copper. An electron emission material sample of Example 19 was obtained as follows. The carbon fiber composite material was supplied to a five-fold amount of toluene and dissolved with stirring to obtain a coating liquid. The coating liquid was applied to a copper substrate by using a screen printing method and then dried to form a thin film with a thickness of 0.05 mm on the substrate. The electron emission material samples other than the electron emission material sample of Example 14 were uncrosslinked. In the preparation of the electron emission material of Example 14, 2 phr of peroxide was added in the mixing step in (a), and the carbon fiber composite material was press-crosslinked at 175° C. for 20 min.

(6) Measurement of Properties

The tensile strength and the dynamic storage modulus (E') of the electron emission materials of Examples 11 to 19 and Comparative Example 4 were measured. The results are shown in Table 4.

(7) Measurement of Threshold Electric Field and Saturation Current Density

The threshold value and the saturation current density of the electron emission materials of Examples 11 to 19 and Comparative Example 4 were measured by using a device as shown in FIG. 9. In the measurement of the threshold value, voltage was gradually applied between the anode and the cathode, and the electric field (voltage/electrode-to-electrode distance) at which electron emission started to occur was taken as the threshold electric field. In the measurement of the saturation current density, voltage was gradually applied between the anode and the cathode, and the value at which the current density was almost saturated was taken as the saturation current density. The measurement results are shown in Table 4.

TABLE 4

| | | | Example | | | | | |
|---|---|---|---|---|---|---|---|---|
| | | | 11 | 12 | 13 | 14 | 15 | 16 |
| Carbon fiber composite material | | Elastomer | NR | NR | NR | NR | NR | NR |
| | | CNT | MWNT | MWNT | MWNT | MWNT | DWNT | SWNT |
| | Amount (vol %) | Elastomer | 99.5 | 90 | 70 | 90 | 90 | 90 |
| | | CNT | 0.5 | 10 | 30 | 10 | 10 | 10 |
| | | HAF-CB | 0 | 0 | 0 | 0 | 0 | 0 |
| Electron emission material | | Shape | Sheet | Sheet | Sheet | Sheet | Sheet | Sheet |
| | | Average thickness (mm) | 1 | 1 | 1 | 1 | 1 | 1 |
| | | Crosslinking | Uncrosslinked | Uncrosslinked | Uncrosslinked | Crosslinked | Uncrosslinked | Uncrosslinked |
| | Properties | Tensile strength (MPa) | 5 | 13 | 23 | 15 | 12 | 11 |
| | | E' (MPa) | 12 | 68 | 760 | 66 | 72 | 69 |
| | | Cathode substrate | Cu | Cu | Cu | Cu | Cu | Cu |
| | | Threshold electric field (V/μm) | 3.9 | 3.3 | 3.6 | 3.4 | 2.1 | 2.9 |
| | | Saturation current density of electron emission (mA/cm²) | 110 | 420 | 530 | 400 | 880 | 750 |

| | | | Example | | | Comparative Example | |
|---|---|---|---|---|---|---|---|
| | | | 17 | 18 | 19 | 4 | 5 |
| Carbon fiber composite material | | Elastomer | EPDM | E-SBS | NR | NR | NR |
| | | CNT | MWNT | MWNT | MWNT | None | MWNT |
| | Amount (vol %) | Elastomer | 90 | 90 | 90 | 90 | 60 |
| | | CNT | 10 | 10 | 10 | 0 | 40 |
| | | HAF-CB | 0 | 0 | 0 | 10 | 0 |
| Electron emission material | | Shape | Sheet | Sheet | Thin film | Sheet | — |
| | | Average thickness (mm) | 1 | 1 | 0.05 | 1 | — |
| | | Crosslinking | Uncrosslinked | Uncrosslinked | Uncrosslinked | Uncrosslinked | — |
| | Properties | Tensile strength (MPa) | 7 | 24 | 12 | 9 | — |
| | | E' (MPa) | 26 | 160 | 61 | 3 | — |

TABLE 4-continued

| | | | | | |
|---|---|---|---|---|---|
| Cathode substrate | Cu | Cu | Cu | Cu | — |
| Threshold electric field (V/μm) | 3.8 | 3.1 | 3.2 | — | — |
| Saturation current density of electron emission (mA/cm$^2$) | 360 | 520 | 570 | — | — |

As is clear from Table 4, the following items were confirmed according to Examples 11 to 19 of the invention. Specifically, it was confirmed from Examples 11 to 19 of the invention that a threshold electric field as low as 2.1 to 3.9 (V/μm) is obtained even if the surface of the electron emission material is not processed at all. It was found that the electron emission materials of Examples 11 to 19 had excellent electron emission properties due to high saturation current density. It was also found that the threshold electric field and the saturation current density of the electron emission material are not affected by the presence or absence of crosslinking and are affected to only a small extent by the shape of the electron emission material such as a thin film or a sheet. Note that electron emission did not occur when using the sample of Comparative Example 4.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A method of manufacturing a thin film, the method comprising:
   mixing carbon nanofibers into an elastomer including an unsaturated bond or a group having affinity to the carbon nanofibers, and dispersing the carbon nanofibers by applying a shear force to obtain a carbon fiber composite material;
   mixing the carbon fiber composite material and a solvent to obtain a coating liquid; and
   applying the coating liquid to a substrate to form a thin film;
   wherein a network component of the elastomer in an uncrosslinked form has a spin-spin relaxation time (T2n) measured at 30° C. by a Hahn-echo method using a pulsed nuclear magnetic resonance (NMR) technique with $^1$H as an observing nucleus of 100 to 3,000 μsec, and
   wherein obtaining the carbon fiber composite material is performed at 0 to 50° C.

2. The method of manufacturing a thin film as defined in claim 1, wherein the elastomer has a molecular weight of 5,000 to 5,000,000.

3. The method of manufacturing a thin film as defined in claim 1, wherein at least one of a main chain, a side chain, and a terminal chain of the elastomer includes at least one of a double bond, a triple bond, a-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

4. The method of manufacturing a thin film as defined in claim 1, wherein a network component of the elastomer in an crosslinked form has a spin-spin relaxation time (T2n) measured at 30° C. by a Hahn-echo method using a pulsed nuclear magnetic resonance (NMR) technique of 100 to 2,000 μsec.

5. The method of manufacturing a thin film as defined in claim 1, wherein the carbon nanofibers have an average diameter of 0.5 to 500 nm.

6. The method of manufacturing a thin film as defined in claim 1, wherein the step of obtaining the carbon fiber composite material includes tight milling a mixture of the carbon nanofibers and the elastomer by using an open-roll method with a roll interval of 0.5 mm or less.

7. The method of manufacturing a thin film as defined in claim 6, wherein two rolls used in the open-roll method have a surface velocity ratio of 1.05 to 3.00.

8. The method of manufacturing a thin film as defined in claim 1, wherein the step of obtaining the carbon fiber composite material is performed by an internal mixing method.

9. The method of manufacturing a thin film as defined in claim 1, wherein the step of obtaining the carbon fiber composite material is performed by a multi-screw extrusion kneading method.

10. The method of manufacturing a thin film as defined in claim 1, wherein the step of forming the thin film is performed by a method selected from the group consisting of a spin coating method, a dipping method, a screen printing method, a spraying method, and an inkjet method.

11. A method of manufacturing an electron emission material, the method comprising:
    mixing carbon nanofibers into an elastomer including an unsaturated bond or a group having affinity to the carbon nanofibers, and
    dispersing the carbon nanofibers by applying a shear force to obtain a carbon fiber composite material,
    wherein a network component of the elastomer in an uncrosslinked form has a spin-spin relaxation time (T2n) measured at 30° C. by a Hahn-echo method using a pulsed nuclear magnetic resonance (NMR) technique with $^1$H as an observing nucleus of 100 to 3,000 μsec, and
    wherein obtaining the carbon fiber composite material is performed at 0 to 50° C.

12. The method of manufacturing an electron emission material as defined in claim 11, wherein the elastomer has a molecular weight of 5,000 to 5,000,000.

13. The method of manufacturing an electron emission material as defined in claim 11, wherein at least one of a main chain, a side chain, and a terminal chain of the elastomer includes at least one of a double bond, a triple bond, a-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

14. The method of manufacturing an electron emission material as defined in claim 11, wherein a network component of the elastomer in an crosslinked form has a spin-spin relaxation time (T2n) measured at 30° C. by a Hahn-echo method using a pulsed nuclear magnetic resonance (NMR) technique of 100 to 2,000 μsec.

15. The method of manufacturing an electron emission material as defined in claim 11, wherein the carbon nanofibers have an average diameter of 0.5 to 500 nm.

16. The method of manufacturing an electron emission material as defined in claim 11, wherein the step of obtaining the carbon fiber composite material includes tight milling a mixture of the carbon nanofibers and the elastomer by using an open-roll method with a roll interval of 0.5 mm or less.

17. The method of manufacturing an electron emission material as defined in claim 16, wherein two rolls used in the open-roll method have a surface velocity ratio of 1.05 to 3.00.

18. The method of manufacturing an electron emission material as defined in claim 11, wherein the step of obtaining the carbon fiber composite material is performed by an internal mixing method.

19. The method of manufacturing an electron emission material as defined in claim 11, wherein the step of obtaining the carbon fiber composite material is performed by a multi-screw extrusion kneading method.

* * * * *